(12) United States Patent
Maddox et al.

(10) Patent No.: US 6,410,659 B1
(45) Date of Patent: *Jun. 25, 2002

(54) POLYMERIZATION PROCESS

(75) Inventors: Peter James Maddox, Kingston-Upon-Thames; John Paul McNally, Reading; David Pratt, Egham, all of (GB)

(73) Assignee: BP Chemicals Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,236

(22) Filed: Jul. 31, 1997

Related U.S. Application Data

(63) Continuation of application No. 08/657,534, filed on Jun. 5, 1996, now abandoned, which is a continuation of application No. 08/410,984, filed on Mar. 27, 1995, now abandoned.

(30) Foreign Application Priority Data

Apr. 7, 1994 (GB) .............................. 9406855
Aug. 26, 1994 (GB) .............................. 9417364

(51) Int. Cl.$^7$ .......................... C08F 4/64; C08F 4/642; C08F 4/646
(52) U.S. Cl. ..................... 526/114; 526/113; 526/118; 526/119; 526/160; 526/901; 526/943
(58) Field of Search ................ 526/114, 119, 526/160, 901, 943, 113, 118

(56) References Cited

U.S. PATENT DOCUMENTS

| | | | | |
|---|---|---|---|---|
| 5,032,562 A | * | 7/1991 | Lo et al. ...................... | 502/111 |
| 5,124,418 A | * | 6/1992 | Welborn, Jr. ................. | 526/114 |
| 5,145,818 A | * | 9/1992 | Tsutsui et al. ............... | 502/113 |
| 5,332,706 A | * | 7/1994 | Nowlin et al. ............... | 502/107 |
| 5,395,810 A | * | 3/1995 | Shamshoum et al. ........ | 502/113 |

* cited by examiner

Primary Examiner—David W. Wu
Assistant Examiner—R. Rabago
(74) Attorney, Agent, or Firm—Morgan & Finnegan L.L.P.

(57) ABSTRACT

A process for preparing bimodal molecular weight distribution copolymers of ethylene with alpha-olefins having 3 to 20 carbon atoms, said copolymers having:

(a) a comonomer distribution wherein the comonomer level at the mid-position of the low molecular weight component is <3 times the level at the mid-position of the high molecular weight component, and (b) a total average comonomer content in the range 0.5–20 short chain branches (SCB)/1000 C atoms characterised in that said process is carried out in the presence of a supported multisite catalyst. The multisite catalyst comprises a metallocene complex and a Ziegler catalyst. The metallocene complex for example is bis(pentamethylcyclopentadienyl) zirconium dichloride.

11 Claims, No Drawings

POLYMERIZATION PROCESS

This application is a continuation, of application Ser. No. 08/657,534, filed Jun. 5, 1996, now abandoned, which is a continuation, of application Ser. No. 08/410,984, filed Mar. 27, 1995, now abandoned.

The present invention relates to a process for preparing copolymers, in particular to a process for preparing copolymers of ethylene with alpha-olefins having a bimodal molecular weight distribution.

Bimodal or multimodal polyolefins with broad molecular weight distributions are obtained commercially using Ziegler catalysts in slurry or gas phase polymerisation processes in which different operating conditions, are employed. Such processes are known as cascade processes. Polymers obtained in such processes often selectively incorporate comonomers in one part of the molecular weight distribution. Other parts of the polymer often contain little or no comonomer incorporation.

These polymers have been found to offer advantages in processability and tear, impact, stress crack and fracture properties depending upon the polymer application envisaged.

The cascade process relies upon different operating conditions, often using two separate reactors. It would be advantageous to be able to produce such polymers in a single reactor preferably in the gas phase under steady state conditions.

Bimodal polyolefins may be prepared by using combinations of polymerisation catalysts as components, for example a metallocene and a Ziegler catalyst or alternatively two different metallocene catalysts may be used. Such catalyst systems may be referred to as multisite catalysts. In such systems the different catalyst components must be able to produce polyolefins of different molecular weights under a single set of reactor process operating conditions, so that a bimodal molecular weight distribution is formed. Typically the low molecular weight portion of such bimodal polymers are derived from the metallocene component(s) of the catalyst.

It would also be desirable to use multisite catalysts to prepare polyolefins with specific comononer distributions across their bimodal molecular weight distributions. Unfortunately metallocene components conventionally used in multisite catalysts are known for the ability to incorporate high quantities of comonomer relative to Ziegler catalysts, resulting in bimodal MWD polymers in which comonomer is concentrated in the low MW portion.

It has now been found that certain metallocene components have a low propensity for incorporating comonomer into bimodal polymer even in the presence of high concentrations of comonomer and may be utilized to control the comonomer distribution.

The comonomer distribution is dependent upon the comonomer incorporation properties of the individual components of the multisite catalyst. Hence by using such metallocene components having a low propensity for incorporating comonomer, polymers may be obtained which typically exhibit a bimodal comonomer distribution in which the comonomer is more evenly distributed over the MWD or is even concentrated in the high molecular weight component.

Thus according to the present invention there is provided a process for preparing bimodal molecular weight distribution-copolymers of ethylene with alpha-olefins having 3 to 20 carbon atoms, said copolymers having:
(a) a comonomer distribution wherein the comonomer level at the mid-position of the low molecular weight component is <3 times the level at the mid position of the high molecular weight component, and
(b) a total average comonomer content in the range 0.5–20 short chain branches (SCB)/1000 C atoms and characterised in that said process is carried out in the presence of a supported multisite catalyst.

The "comonomer level" defined in (a) represents the comonomer content, measured in short chain brafiches per thousand backbone carbon atoms (SCB/1000 C), of the polymer at the specified molecular weight which is independent of the proportion of the total polymer represented by the polymer at that molecular weight.

The "total average comonomer content" defined in (b) is the average comonomer content, in SCB/1000 C, of all polymer over the entire molecular weight range.

The multisite catalyst is defined as comprising two active components for example a Ziegler catalyst component producing a high molecular weight polymer component and a metallocene component producing a low molecular weight polymer component. The metallocene component may also be comprised of two or more different metallocene species provided that together they provide the required low molecular weight polymer component.

Examples of metallocenes suitable for use in the present invention are represented by the following Formulae:

  (I)

  (II)

  (III)

  (IV)

wherein, $C_5R_5$ and $C_5R^1_5$ etc represent a cyclopentadienyl ligand,

R and $R^1$ alkyl, aryl, alkylaryl, alkenyl, or haloalkyl and may be the same or different, z=bridging group comprising $CX_2$, $SiX_2$, $GeX_2$ etc, X=hydrogen or as defined by R and $R^1$ above, M=Zr, Ti or Hf, Y=univalent anionic ligand for example halide, alkyl, alkoxy, etc.

and wherein in Formula (II) at least one of R and $R^1$ has $\geq 3$ carbon atoms and in Formula (IV) m=3 or 4.

Examples of suitable metallocenes as represented by Formula (I) and (II) are bis(pentamethylcyclopentadienyl) zirconium dichloride and bis(1-propenyl-2-methylcyclopentadienyl) zirconium dichloride respectively.

These metallocenes are represented by the Formula:

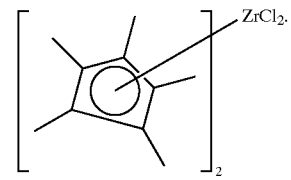

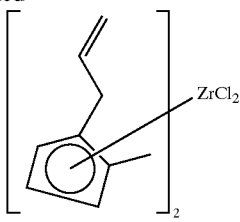

By using the multisite catalysts of the present invention, polymer compositions containing a lower absolute comonomer incorporation level may be obtained for a given set of reaction conditions.

The metallocenes may be prepared in accordance with literature methods eg J E Bercaw et al JACS 100, 10, 3078, Canadian Journal of Chemistry 69, 1991, 661–672 and E Samuel et al J. Organometallic Chem. 1976, 113, 331–339.

Bimodal distribution is defined as relating to copolymers which show a substantially different molecular weight distribution between the low and the high molecular weight components.

Typically the low molecular weight component has a mid-position in the range 1000–300,000 preferably in the range 5000–50,000 and the high molecular weight component has a mid-position in the range 100,000–10,000,000 preferably in the range 150,000–750,000.

The total average comonomer content is preferably in the range 1 to 20 SCB/1000 C atoms.

The multisite catalyst for use in the present invention may be used in the presence of suitable co-catalysts. Suitable co-catalysts are organometallic compounds having a metal of Group IA, IIA, IIB or IIIB of the periodic table. Preferably, the metals are selected from the group including lithium, aluminium, magnesium, zinc and boron. Such co-catalysts are known for their use in polymerisation reactions, especially the polymerisation of olefins, and include organo aluminium compounds such as trialkyl, alkyl hydrido, alkyl halo, alkyl alkoxy aluminium compounds and alkyl aluminoxanes. Suitably each alkyl or alkoxy group contains 1 to 6 carbons. Examples of such compounds include trimethyl aluminium, triethyl aluminium, diethyl aluminium hydride, triisobutyl aluminium, tridecyl aluminium, tridodecyl aluminium, diethyl aluminium methoxide diethyl aluminium ethoxide, diethyl aluminium phenoxide, diethyl aluminium chloride, ethyl aluminium dichloride, methyl diethyoxy aluminium and methyl aluminoxane.

The preferred compounds are alkyl aluminoxanes, the alkyl group having 1 to 10 carbon atoms, especially methyl aluminoxane (MAO) and trialkyl aluminium compounds eg trimethylaluminium. Other suitable co-catalysts also include Bronsted or Lewis acids.

The co-catalyst may be mixed with the supported multisite catalyst. For example the metallocene component and co-catalyst (eg MAO) may be added to a supported Ziegler catalyst. During the subsequent polymerisation process a second cocatalyst (eg trimethylaluminium) may be added to the reaction medium.

Catalyst supports used with the multisite catalyst may comprise a single oxide or a combination of oxides or metal halides. They may also be physical mixtures of oxides or halides. The supports may have a high surface area (250–1000M$^2$/g) and a low pore volume (0–1 ml/g) or a low surface area (0–250M$^2$/g) and high pore volume (1–5 ml /g) or preferably high surface area (250–1000M$^2$/g) and high pore volume (1–5 ml/g) (mesoporous). Preferred support materials are silica, alumina, titania, boria and anhydrous magnesium chloride or mixtures thereof, although any support used in heterogeneous catalysis/polymer catalysis may be employed.

The support may undergo a pretreatment to modify its surface eg thermal or chemical dehydroxylation or any combination of these, using agents such as hexamethyldisilazane and trimethylaluminium. Other reagents that can be used are triethyaluminium, methylaluminoxane and other aluminium containing alkyls, magnesium alkyls especially dibutyl magnesium and alkyl magnesium halides, zinc alkyls and lithium alkyls. Different impregnation regimes may be used to add the surface treatment and subsequent catalyst impregnation. Impregnation may take place sequentially or in a number of separate steps or in a single step using any method known in the prior art including vapour phase treatment/impregnation techniques.

The component of the multisite catalyst which provides the high molecular weight component may suitably be a conventional Ziegler catalyst, a Phillips catalyst or alternatively another metallocene catalyst. Preferably the high molecular weight component is a Ziegler catalyst.

A suitable catalyst is disclosed in European Application No. EP 595574.

The multisite catalyst used in the process according to the present invention may be used to produce polymers using solution polymerisation, slurry polymerisation or gas phase polymerisation techniques. Suitably alpha olefins used in the copolymerisation may be butene-1, hexene-1, 4-methyl pentene-1 octene-1 or higher α-olefins which may be provided in-situ. Methods and apparatus for effecting such polymerisation reactions are well known and described in, for example, Encyclopaedia of Polymer Science and Engineering published by John Wiley and Sons, 1987, Volume 7, pages 480 to 488 and 1988, Volume 12, pages 504 to 541. The multisite catalyst composition according to the present invention may be used in similar amounts and under similar conditions to known olefin polymerisation catalysts.

The polymerisation may optionally be carried out in the presence of hydrogen. Hydrogen or other suitable chain transfer agents may be employed in the polymerisation to control the molecular weight of the produced polyolefin. The amount of hydrogen may be such that the ratio of the partial pressure of hydrogen to that of olefin(s) is from 0.0001–1, preferably 0.001–0.1.

Typically, the temperature is from 30 to 110° C. for the slurry or "particle form" process or for the gas phase process. For the solution process the temperature is typically from 100 to 250° C. The pressure used can be selected from a relatively wide range of suitable pressure, eg from sub-atmospheric to about 350 MPa. suitably, the pressure is from atmospheric to about 6.9 MPa, or may be from 0.05–10, especially 0.14 to 5.5 MPa. In the slurry or particle form process the process is suitably performed with a liquid inert diluent such as a saturated aliphatic hydrocarbon. Suitably the hydrocarbon is a C4 to C10 hydrocarbon, eg isobutane or an aromatic hydrocarbon liquid such as benzene, toluene or xylene. The polymer is recovered directly from the gas phase process, by filtration or evaporation from the slurry process and by evaporation from the solution process.

The process according to the present invention is particularly suitable for use in the gas phase.

By using the multisite catalysts of the present invention copolymer compositions containing a lower absolute comonomer incorporation level than comparable compositions when prepared under the same polymerisation reaction conditions may be prepared. This can lead to enhanced product properties for example higher stiffness for high density tough film. The ability to operate in the presence of a relatively high comonomer concentration yet produce products containing a low absolute comonomer level is also advantageous because it allows access to a wider range of molecular weight distribution for a given density range.

The present invention will now be illustrated with reference to the following examples.

EXAMPLE 1

Preparation of Bis(propenylcyclopentadienyl) zirconium Dichloride (Comparative)

Allyl bromide (50 g) was dissolved in tetrahydrofuran (200 ml, dried) and cooled to 0° C. To this was added a tetrahydrofuran solution of sodium cyclopentadienylide (220 ml, 2.0 M) and the solution stirred for 16 h. To the mixture was added saturated aqueous ammonium chloride solution (200 ml); the organic phase was separated, washed with water (3 times with 200 ml) and dried over anhydrous magnesium sulphate. The solution was filtered, the solvent removed on a rotary evaporator and the resulting yellow oil vacuum distilled (30–40° C., 17 mmHg) to yield propenylcyclopentadiene (13.99 g, 32.5% yield).

Methyl lithium solution (75.25 ml, 1.4M in diethyl ether) was slowly added to a rapidly stirred solution of propenylcyclopentadiene (11.17 g) in dry diethyl ether at 0° C. The reaction was warmed to 20° C. and stirring continued until gas evolution had ceased. The precipitated lithium propenylcyclopentadienylide was isolated by filtration, washed with diethyl ether (2 times 1000 ml) and pumped to dryness to give 10.65 g of fine white powder. To a rapidly stirred tetrahydrofuran solution (100 ml) of the lithium propenylcyclopentadienylide at 0° C. was added zirconium tetrachloride (11.09 g, 47.5 mmol) dissolved in dry tetrahydrofuran (100 ml). The reaction mixture was allowed to warm to 20° C. and was stirred for 16 h. The volatiles were removed under vacuum, the residue extracted with diethyl ether (4 times 100 ml) and filtered. The product was obtained as a microcrystalline white solid upon slow cooling of the solution to –78° C. Recrystallisation from cold ether yielded bis(propenylcyclopentadienyl)zirconium dichloride (13.33 g, 75.4% yield).

EXAMPLE 2

Preparation of Bis(1-propenyl-2-methylcyclopentadienyl)zirconium Dichloride

Propenylcyclopentadiene (7.5 g) as prepared in Example 1 was dissolved in diethyl ether (100 ml, dried) and cooled to –78° C. A diethyl ether solution of methyl lithium (55 ml, 1.4M) was cautiously added, the cold bath was removed and the solution left stirring for 16 h at 20° C. The solid lithium propenylcyclopentadienylide salt obtained was filtered, washed with cold diethyl ether (twice at 0° C., 50 ml) and pumped to dryness (7.8 g, 100% yield). The lithium salt was dissolved in tetrahydrofuran (100 ml), cooled to –78° C., and to it was slowly added a tetrahydrofuran solution of methyl iodide (10 g). The reaction was stirred for 16 hrs at 20° C. and then quenched with saturated aqueous ammonium chloride solution (200 ml). Diethyl ether (50 ml) was added, the organic phase isolated and washed with water (3 times 100 ml). After drying over anhydrous magnesium sulphate the solution was filtered and the solvent removed under vacuum (18 mmHg, 20° C.) to yield a brown oil, shown by NMR to be methylpropenylcyclopentadiene with traces of solvent (7.4 g yield).

Methylpropenylcyclopentadiene as prepared above (4.07 g) was dissolved in diethyl ether (100 ml, dried) and cooled to –78° C. A diethyl ether solution of methyl lithium (25 ml, 1.4M) was cautiously added and the solution stirred at 20° C. for 16 hrs. The thick suspension obtained was pumped to dryness to yield an off-white powder of lithium methylpropenylcyclopentadienylide (4.17 g, 97.5% yield) which was dissolved in tetrahydrofuran and cooled to 0° C. A slurry of $ZrCl_4$2 tetrahydrofuran (5.0 g) in tetrahydrofuran was added to the lithium salt solution and was stirred at 20° C. for 72 hrs. The reaction was then quenched with dry hydrogen chloride gas at 0° C., pumped to dryness and the product extracted with dichloromethane (2 times 50 ml). The volume of dichloromethane was reduced to 25 ml and heptane was added until precipitation started. Precipitation was completed by cooling the solution to –20° C. for 16 h and the solid product bis(1-propenyl-2-methylcyclopentadienyl) zirconium dichloride was isolated by filtration, washed with hexane (2 times 50 ml) and pumped dry. (2.7 g, 52% yield).

EXAMPLE 3

Bis-(Dentamethylycyloientadienyl)zirconium Dichloride

Bis-(pentamethylcyclopentadienyl)zirconium dichloride was purchased from Stream Chemicals (Fluorochem) and used as received.

Supported Ziegler Catalysts

EXAMPLE 4

Silica (Crosfield ES70, dried at 800° C. for 5 h in flowing nitrogen, 20 kg) was slurried in hexane (110 L, dry) and hexamethyldisilazane (Fluka, 30 mols, 0.8 mM/g of silica) added with stirring at 50° C. 120 L of hexane was added with stirring, the solid was allowed to settle, supernatant liquid removed by decantation and hexane (130 L, dry) added with stirring. This hexane washing was repeated a further 3 times. Dibutylmagnesium (FMC, 30 mols, 1.5 mM/g of silica) was added and stirred for 1 h at 50° C. t-Butyl chloride (Hüls, 60 mols, 3 mM/g of silica) was added and stirred for 1 h at 50° C. To this slurry was added an equimolar mixture of titanium tetrachloride (Thann & Mulhouse, 3 mols, 0.15 mM/g of silica) and titanium tetra-n-propoxide (Thann & Mulhouse, 3 mols, 0.15 mM/g of silica) with stirring at 50° C. for 2 hrs, followed by 5 washings with 130 L hexane. The slurry was dried under a flowing nitrogen stream to give a solid, silica-supported Ziegler catalyst.

EXAMPLE 5

Silica (Crosfield ES70, dried at 800° C. for 5 h in flowing nitrogen, 20 kg) was slurried in hexane (110 L dry) and hexamethyldisilazane (Fluka, 30 mols, 1.5 mM/g of silica) added with stirring at 5° C. The solid was allowed to settle, supernatant liquid removed by decantation and hexane (130 L dry) added with stirring. This hexane washing was repeated a further 3 times. Dibutylmagnesium (FMC 30 mols, 1.5 mM/g of silica) was added and stirred for 1 h at 50° C. t-Butyl chloride (Hüls, 60 mols, 3 mM/g of silica) was added and stirred for 1 h at 50° C. To this slurry was added an equimolar mixture of titanium tetrachloride (Thann & Mulhouse, 3 mols, 0. 15 mM/g of silica) and titanium tetra-n-propoxide (Thann & Mulhouse, 30 mols, 0.15 mM/g of silica) with stirring at 50° C. for 2 hrs at 80° C. followed by 3 washings with 130 L hexane. The slurry was dried under a flowing nitrogen stream to give a solid, silica-supported Ziegler catalyst.

EXAMPLE 6

Silica (Crosfield ES70, dried at 800° C. for 5 h in flowing nitrogen, 14.8 g) was slurried in hexane (150 ml, dry) and hexamethyldisilazane (Fluka, 4.4 mM 1.5 mM/g of silica) added with stirring at 80° C. The solid was allowed to settle, supernatant liquid removed by decantation and hexane (500 ml, dry) added with stirring. This hexane washing was repeated a further 4 times. Dibutylmagnesium (FMC, 22.2 mM, 1.5 mM/g of silica) was added and stirred for 1 h at 50° C. t-Butyl chloride (Hüls, 44.4 mM, 3 mM/g of silica) was added and stirred for 1 h at 50° C. To this slurry was added titanium tetrachloride (Thann & Mulhouse, 11.1 mM 0.5 mM/g of silica) with stirring at 50° C. The slurry was dried under a flowing nitrogen stream to give a solid, silica-supported Ziegler catalyst.

Multisite Catalysts

All operations were carried out under an atmosphere of dry nitrogen.

EXAMPLE 7

(Comparative)

Bis-(propenylcyclopentadienyl)zirconium dichloride (0.0454 g) was dissolved in a toluene solution of methylaluminoxane (Schering, 6.9 ml of 2.65M solution) at 20° C. with stirring. This was added to a silica-supported Ziegler catalyst (from Example 5, 2.5 g) and the resulting thick slurry stirred for 75 min at 20° C. The solvent was then removed at 20° C. under vacuum to give a free-flowing powder.

EXAMPLE 8

Bis-(1-propenyl-2-methylcyclopentadienyl)zirconium dichloride (0.0488 g) was dissolved in a toluene solution of methylaluminoxane (Schering, 7.8 ml of 2.35M solution), with a further 9.2 ml toluene added. This was added to a silica-supported Ziegler catalyst (from Example 5, 2.5 g) and the resulting thick slurry stirred for 180 min at 50° C. The solvent was then removed at 20° C. under vacuum to give a free-flowing powder.

EXAMPLE 9

Bis-(1-propenyl-2-methylcyclopentadienyl)zirconium dichloride (0.039 g) was dissolved in a toluene solution of methylaluminoxane (Schering, 6.3 ml of 2.33M solution), with a further 7.7 ml toluene added. This was added to a silica-supported Ziegler catalyst (from Example 6, 2 g) and the resulting thick slurry stirred for 180 min at 50° C. The solvent was then removed at 20° C. under vacuum to give a free-flowing powder.

EXAMPLE 10

Bis-(pentamethylcyclopentadienyl)zirconium dichloride (0.054 g) was dissolved in a toluene solution of methylaluminoxane (Schering, 8 ml of 2.35M solution), with a further 8 ml toluene added, at 20° C. with stirring. This was added to a silica-supported Ziegler catalyst (from Example 4, 2.5 g) and the resulting thick slurry stirred for 75 min at 50° C. The solvent was then removed at 20° C. under vacuum to give a free-flowing powder.

Polymerisation Reactions

EXAMPLE 11

(Comparative)

A 3 liter reactor equipped with helical stirrer was heated to 80° C. for 1 h under flowing nitrogen. Dry sodium chloride (300 g) was then added with trimethylaluminium (TMA) solution (2 ml of 2M TMA in hexanes) and the reactor heated to 80° C. for 1 h. The reactor was purged with nitrogen, cooled to 45° C. and TMA solution (1.8 ml of 0.5M TMA in hexanes) added. The temperature was raised to 75° C. and hydrogen (0.58 psi) and 1-hexene (2 ml) added prior to addition of ethylene (7.9 bar). Reaction was started by injection of the catalyst of Example 7 (0.129 g) into the reactor. The temperature was maintained at 75° C. and ethylene added to maintain constant pressure. The gas phase was monitored by mass spectrometer and hydrogen and 1-hexene were added as necessary to maintain constant gas phase concentrations. After the designated polymerisation time (129 minutes) the reaction was quenched by rapid reduction of the reactor to atmospheric pressure purging with-nitrogen and cooling to room temperature. Results are given in the accompanying Table 1.

EXAMPLES 12–14

The same procedure was carried out as described in Example 11 using the catalysts of Examples 8–10. Details are given below in the Table 1.

Analytical Methods

GPC-IR

An infrared flow-through cell, (path length 1 mm) was used, coupled directly to the GPC columns in a Waters 150CV chromatograph. The tubing connecting the 150CV to the infrared cell was heated to 140° C. Samples were prepared as 0.5%(w/v) solutions in trichlorobenzene/80 ppm ionol, heated to 140° C. for two hours, to 160° C. for two hours and then filtered through a stainless steel cup filter (0.5 microns). The sample solutions were characterised at 140° C. using Shodex $10^7$ Å, $10^4$ Å, linear columns with an eluant flowrate of 1 ml/minute, calibrated with narrow polystyrene standards of known molecular weight. A Bio-Rad FTS-60A FTIR spectrometer with Bio-Rad WIN-IR software was used to aquire the Infrared spectra, using a liquid nitrogen-cooled MCT detector, over the range 3010 to 2820 $cm^{-1}$, at a resolution of 4 $cm^{-1}$. Typically, acquisition times were 30 secs (64 scans), and spectral acquisition carried out at 1 minute intervals. The background spectrum used was a solvent spectrum acquired during the period between sample injection and the first appearance of polyethylene. 500 scans were acquired for each background.

Branching levels were based on the ratio of the methyl band at 2958 $cm^{-1}$ to that of the methylene peak at 2927 $cm^{-1}$. A linear baseline was constructed between 2990 and 2825 $cm^{-1}$. Results were converted from peak ratios to branching levels using a conversion calculated from analysis of a polyethylene for which NMR branching data were known. Corrections were made for the contribution of the methylene peak at the frequency used for measuring methyl groups, calculated from a linear homopolymer. Corrections were also made for the contribution from methyl groups at chain ends, based on the molecular weight of the polymer as indicated by the GPC elution time. For the purposes of this measurement it was assumed that all methyl groups occur at the same frequency and that all have the same extinction coefficient. Molecular weights for polyethylenes were derived from polystyrene elution times using the Mark-Houwink relationship, and end corrections were based on the elution time half way through each spectral acquisition, to correct for any change in composition during the acquisition of a spectrum.

The results of the analytical methods are given below in Table 2.

From Table 2 it can be clearly seen that the comonomer distribution in examples 12–14, as determined from the relationship between the comonomer level at the mid-positions of the low and high MW components is <3 whereas in example 11 (comparative) this value is >3 ie 4.2.

TABLE 1

| Example | Catalyst Example | C2 Pressure (bar) | H2 Pressure (psi) | 1-Hexene (ml) | Run Time (min) | Polymer Yield (g) | Activity (gPE/mmol(Ti + Zr).h.b.) |
|---|---|---|---|---|---|---|---|
| 11 | 7 | 7.9 | 0.58 | 2 | 129 | 193 | 372 |
| 12 | 8 | 8 | 0.87 | 1.7 | 120 | 56 | 67 |
| 13 | 9 | 8 | 1 | 1.2 | 120 | 103 | 273 |
| 14 | 10 | 7.9 | 0.44 | 4 | 120 | 101 | 199 |

TABLE 2

| | | Molecular Weight | | Comonomer Content and Distribution | |
|---|---|---|---|---|---|
| | | | | Total Average | Comonomer Distribution |
| Example | Metallocene Component | Low Mpk value | High Mpk value | Comonomer Content SCB/1000C | Low Mpk/high Mpk at mid-position |
| 11 | bis-(propenylcyclopentadienyl)ZrCl2 | 40 600 | 500 000 | 9 | 4.2 |
| 12 | bis-(1,2-propenyl,methylcyclopentadienyl)ZrCl2 | 6 200 | 612 000 | 7.4 | 1.6 |
| 13 | bis-(1,2-propenyl,methylcyclopentadienyl)ZrCl2 | 5 000 | 412 000 | 3.8 | 1.4 |
| 14 | bis-(pentamethylcyclopentadienyl)ZrCl2 | 7 500 | 437 600 | 5 | 0.4 |

We claim:

1. A process for preparing bimodal molecular weight distribution copolymers of ethylene with alpha-olefins having from 3 to 20 carbon atoms, said copolymers having:

(a) a comonomer distribution wherein the comonomer level at the mid-position of the low molecular weight component is less than or equal to 1.6 times the level at the mid-position of the high molecular weight component, and (b) a total average comonomer content in the range from 0.5 to 20 short chain branches (SCB)/1000 carbon atoms wherein said process is carried out in the presence of a supported multisite catalyst, wherein all the catalyst components are supported on a single support, said catalyst comprising a Ziegler catalyst component and a metallocene component having any of the formulae:

$$(C_5R_5)(C_5R^1_5)MY_2 \quad (I)$$

$$(C_5R_2H_3)(C_5R^1_2H_3)MY_2 \quad (II)$$

$$(C_5R_4)Z(C_5R^1_4)MY_2; \quad (III)$$

or $$(C_5R_mH_{5-m})(C_5R^1_nR_{5-n})MY_2 \quad (IV)$$

wherein:

$C_5R_5$ and $C_5R^1_5$ represent a cyclopentadienyl ligand,

R and $R^1$ are alkyl, aryl, alkylaryl, alkenyl, or haloalkyl groups and may be the same or different, Z is a bridging group selected from the group consisting of $CX_2$, $SiX_2$, and $GeX_2$, X is hydrogen or a group as defined by R and $R^1$, M is Zr, Ti, or Hf, Y is a univalent anionic ligand and wherein in Formula (II) at least one of R and $R^1$ has ≧three carbon atoms, and in Formula (IV) m is 3 or 4 and n is 5 or less.

2. A process according to claim 1 wherein the total average comonomer content is in the range from 1 to 20 short chain branches (SCB)/1000 C atoms.

3. A process according to claim 1 wherein the multisite catalyst is supported on silica, alumina or magnesium chloride.

4. A process according to claim 1 wherein M is zirconium.

5. A process according to claim 1 wherein the metallocene component is bis(pentamethylcyclopentadienyl) zirconium dichloride or bis(1-propenyl-2-methylcyclopentadienyl) zirconium dichloride.

6. A process according to claim 1 wherein the multisite catalyst is used in the presence of at least one co-catalyst.

7. A process according to claim 6 wherein the co-catalyst is an organo aluminium compound.

8. A process according to claim 7 wherein the organo aluminium compound is methyl aluminoxane or trimethyl aluminium.

9. A process according to claim 1 carried out in the gas phase.

10. A process as defined in claim 1 wherein Y is a halide or an alkyl or an alkoxy group.

11. A process as defined in claim 1 wherein the bridging group Z is $CX_2$, $SiX_2$, or $GeX_2$ and Y is a halide or an alkyl or an alkoxy group.

* * * * *